US005158983A

United States Patent [19]

Stapp

[11] Patent Number: 5,158,983

[45] Date of Patent: Oct. 27, 1992

[54] CONVERSION OF AUTOMOTIVE TIRE SCRAP TO USEFUL OILS

[75] Inventor: Paul R. Stapp, Bartlesville, Okla.

[73] Assignee: IIT Research Institute, Chicago, Ill.

[21] Appl. No.: 771,734

[22] Filed: Oct. 4, 1991

[51] Int. Cl.[5] .............................................. C08J 11/04

[52] U.S. Cl. ........................................ 521/41; 521/47; 521/48; 208/15; 208/16; 208/17; 208/18; 585/241

[58] Field of Search ............... 521/41, 47, 48; 208/15, 208/16, 17, 18; 585/241

[56] References Cited

U.S. PATENT DOCUMENTS

| | | | |
|---|---|---|---|
| 3,947,256 | 3/1976 | Tsukagoshi et al. | 208/15 |
| 4,118,281 | 10/1978 | Yan | 521/40.5 |
| 4,642,401 | 2/1987 | Coenen et al. | 585/241 |
| 4,746,406 | 5/1988 | Timmann | 585/241 |
| 5,095,040 | 3/1992 | Ledford | 521/41 |

*Primary Examiner*—Paul R. Michl
*Assistant Examiner*—Olga Asinovsky
*Attorney, Agent, or Firm*—Fitch, Even, Tabin & Flannery

[57] ABSTRACT

The present invention is directed to a process for the conversion of waste plastics and scrap rubber to a high quality synthetic crude oil which can be separated by fractionation into gasoline, diesel fuel and gas oils suitable as a feedstock to a catalytic cracker. The process generally includes the steps of heating the plastic scrap and scrap automotive tires in a hydrogen atmosphere at moderate temperatures and pressures. It has also been determined that the polymeric waste material must be present in combination with the scrap automotive tires to attain conversion of the scrap automotive tires to liquid hydrocarbon.

15 Claims, No Drawings

CONVERSION OF AUTOMOTIVE TIRE SCRAP TO USEFUL OILS

FIELD OF THE INVENTION

The present invention is directed to a process for converting scrap automotive tires to an oil feedstock. More particularly, the present invention is directed to a process for treating a mixture of particulate scrap automotive tires and polymeric waste wherein the mixture is broken down into liquid hydrocarbon materials having a boiling point below about 1,000° F.

BACKGROUND OF THE INVENTION

In an article by Williams, et al., Fuel, December, 1990, Vol. 69, pp. 1474–1482, it was reported that the disposal of scrap tires is an increasing environmental problem. For example, estimates for the generation of scrap tires are $1.5\times10^6$ tons per year in the European Community, $2.5\times10^6$ tons per year in North America and $0.5\times10^6$ tons per year in Japan. [Roy, et al., "Pyrolysis and Gasification", Ferrero, et al., Eds., Elsevier Applied Science, London, UK, 1989] The majority of this tire waste is dumped in open or landfill sites. However, tires do not degrade in landfills and open dumping may result in accidental fires with high pollution emissions. In addition, this method of disposal ignores the large energy potential of scrap tires. Incineration has been considered as an alternative to dumping in an effort to utilize the high calorific value of scrap tires ($\simeq$36–40 Mj $kg^{-1}$), but this disposal route may not maximize the potential economic recovery of energy and chemical materials from the waste. Pyrolysis of tires to produce liquid hydrocarbons and gases is currently receiving renewed attention [Roy, et al., supra; Williams, et al., "Pyrolysis and Gasification", Ferrero, et al., Eds., Elsevier Applied Science, London, UK, 1989; Cypres, et al. "Pyrolysis and Gasification", Ferrero, et al., Eds., Elsevier Applied Science, London, UK, 1989; Kaminsky, et al., "Thermal conversion of Solid Wastes and Biomass", Jones, et al., Eds., American Chemical Society Symposium Series 130, 1980; Wilkins, et al., J. Environ. Sci. Health, A18(6), 747, 1983; Kawakami, et al., "Thermal Conversion of Solid Wastes and Biomass", Jones, et al., Eds., American Chemical Society Symposium Series 130, 1980] since the derived products are easily handled, stored and transported and hence do not have to be used at or near the recycling plant. The derived oils may be used directly as fuel or added to petroleum refinery feedstocks. The oils may also be an important source of refined chemicals, since it has been shown that they contain high concentrations of potentially valuable chemical feedstocks, for example, benzene, toluene and xylene [Roy, et al., supra; Kaminsky, et al., supra; Collin, G., "Thermal Conversion of Solid Wastes and Biomass", Jones, et al., Eds., American Chemical Society Symposium 130, 1980]. The derived gases are also useful as fuel and the solid char may be used either as smokeless fuel, carbon black or activated carbon [Roy, et al., supra; Cypres, et al., supra; Kawakami, et al., supra].

Tires contain vulcanized rubber in addition to the rubberized fabric with reinforcing textile cords, steel or fabric belts and steel-wire reinforcing beads [Dodds, et al., "Scrap Tyres: a Resource and Technology Evaluation of Tyre Pyrolysis and Other Selected Alternative Technologies", U.S. Dept. of Energy Report, EGG-2241, 1983]. The most commonly used tire rubber is styrene-butadiene-copolymer (SBR) containing about 25 weight percent styrene. Other rubbers used in tire manufacture include natural rubber (cis-polyisoprene), synthetic cis-polyisoprene and cis-polybutadiene. The carbo black is used to strengthen the rubber and aid abrasion resistance, and the extender oil is a mixture of aromatic hydrocarbons which serves to soften the rubber and improve workability. Sulfur is used to cross link the polymer chains within the rubber and also hardens and prevents excessive deformation at elevated temperatures. The accelerator is typically an organo-sulfur compound which acts as a catalyst for the vulcanization process. The zinc oxide and stearic acid also act to control the vulcanization process and in addition enhance the physical properties of the rubber.

A number of commercial and pilot plant systems have been reported for the pyrolysis of automotive tire waste, for example externally heated rotary kilns, fluidized beds, continuous and batch fed static reactors and molten salt pyrolysis. The advantage of the pyrolytic treatment of scrap tires may be significantly enhanced if the process conditions can be used to optimize the final product composition and yield for the required end use. Kaminsky, et al., supra; have shown, using a fluidized bed pyrolyzer for scrap tires, that increasing the temperature from 640° C. to 840° C. produces an increase in the yield of carbon black, hydrogen, methane and benzene, and a decrease in the yield of oil. Kawakami, et al., supra, used a rotary kiln pyrolyzer and similarly showed a decrease in oil and increase in gas yield on raising the pyrolsysis temperature from 540° C. to 740° C. They also showed that the properties of the char in relation to carbon black were significantly altered over the temperature range. The Roy, et al. reference, above, used a vacuum pyrolysis reactor and showed a decrease in carbon black and increase in oil and gas yield on raising the temperature to 500° C. The gas was mainly composed of hydrogen, carbon monoxide and carbon dioxide and hydrocarbons. Douglas, et al., "Symposium on Treatment and Recycling of Solid Wastes", Institute of Solid Wastes Management, Manchester, UK, 1974], using a fixed bed reactor, showed that increasing the heating rate within the reactor up to 45° C./ $min^{-1}$ produced an increase in the char and gas and decrease in the oil yields. They also showed that the gas composition was affected by the heating rate. Although there are some data on total oil, gas and char yields in relation to the thermal processing conditions, there are less data on the chemical composition of the products.

Polymeric materials, referred to hereinafter by the generic term "plastics", account for about 7% of municipal solid waste and up to about 20% of the waste by volume. This amounts to about 10 to about 12 million tons per year in the United States. Although plastics recycling is increasing, reprocessing and recycling generally requires segregation by type of plastic. Consumers, in general, and reprocessors often have no idea as to the composition of individual plastic articles. Consequently, processes for utilization of mixed plastic waste, particularly polystyrene, polypropylene and polyethylene, are urgently needed. The present invention provides a process for conversion of mixed plastic waste materials in combination with scrap automotive tires to a high quality synthetic crude oil which can be separated by fractionation into gasoline, diesel fuel and gas-oil components suitable as a feedstock to a catalytic cracker after removal of any sulfur contributed by the automotive tires. As used herein, the term "plastic waste" includes all forms of polymeric materials which require or will benefit from recycling, including processing scrap, municipal waste and recovered or recycled polymeric materials.

U.S. Pat. No. 4,724,068 to Stapp describes a process for hydrotreating hydrocarbon-containing feed streams, especially heavy oils. The process of the Stapp patent utilizes a polymeric treating agent for upgrading the composition of heavy oils. In accordance with the process, an upgrading process is provided comprising the step of contacting (a) a substantially liquid hydrocarbon-containing feed stream substantially simultaneously with (b) free hydrogen, (c) hydrogen sulfide and (d) at least one polymer selected from the group consisting of homopolymers and copolymers of olefinic monomers, in the substantial absence of a solid, inorganic cracking catalyst and a solid inorganic hydroconversion catalyst. The process is performed under conditions so as to obtain a product stream having higher $API_{60}$ gravity and having a lower content of hydrocarbons boiling above 1000° F. than the feed stream.

In accordance with the process of the Stapp patent, impurities contained in the hydrocarbon-containing feed stream are at least partially converted to a "sludge", i.e., a precipitate of metals and coke, which is dispersed in the liquid portion of the hydrocarbon-containing product stream. The sludge and the dispersed olefin polymers are then separated from the liquid portion of the hydrocarbon-containing product stream by any suitable separation means, such as distillation, filtration, centrifugation or settling and subsequent draining of the liquid phase. The hydrocarbon-containing product stream has an increased $API_{60}$ gravity and lower content of heavy fractions. The weight ratio of olefin polymer to hydrocarbon-containing feed is described as being generally in the range of from about 0.01:1 to about 5:1, preferably from about 0.02:1 to about 1:1 and more preferably from about 0.05:1 to about 0.5:1. The Stapp patent generally describes a procedure for hydrovisbreaking a heavy oil with a mixture of hydrogen and hydrogen sulfide in the presence of olefin polymers followed by recovery of an improved hydrocarbon oil product after separation from the olefin polymers.

SUMMARY OF THE INVENTION

It has now been found that waste plastics and scrap rubber can be directly converted to a high quality synthetic crude oil which can be separated by fractionation into gasoline, diesel fuel and gas oils suitable as a feedstock to a catalytic cracker. The process generally includes the steps of heating the plastic scrap and scrap automotive tires in a hydrogen atmosphere at moderate temperatures and pressures. It has also been determined that the polymeric waste material must be present in combination with the scrap automotive tires to attain conversion of the scrap automotive tires to liquid hydrocarbon.

DETAILED DESCRIPTION OF THE INVENTION

The present invention is directed to a process for converting a mixture of scrap automotive tires and polymeric waste to an oil feedstock. In the method, a reaction mixture of scrap automotive tire particles and polymeric scrap particles is provided in a pressurized reaction vessel provided with stirring means, such as a stirred, pressurized autoclave. The mixture is contacted in the reaction vessel with a gas atmosphere selected from hydrogen and mixtures of hydrogen and hydrogen sulfide. The mixture is heated in the reaction vessel to a temperature in the range of from about 350° C. to about 450° C. at a pressure of from about 500 psig to about 5,000 psig, preferably from about 750 psig to about 3,000 psig. for a time sufficient to convert the plastic scrap to liquid hydrocarbon materials having a boiling point below about 1000° F., which time is generally in the range of from about 15 minutes to about 8 hours, preferably from about 30 minutes to about 4 hours.

The scrap automotive tires may be provided from any source, such as light and have duty types, automobile tires and truck tires. About 80% of the manufacture utilizes synthetic rubbers, most commonly, the styrene-butadiene rubbers (SBR). Natural rubber is cis 1,4-polyisoprene. Both natural rubber and synthetic rubber scrap automotive tires can be used in the process of the present invention.

The scrap automotive tires are shredded to a particle size of from about 0.5 to about 2 inches for use in the process. The scrap automotive tires may be processed to remove the belting materials, but such processing is not necessary, particularly if the process of the invention is performed on a continuous basis.

A wide range of plastic waste feedstocks are suitable for use in the present invention. Suitable plastic materials include polystyrene, polypropylene, medium density polyethylene, high density polyethylene, polyisoprene, styrene-butadiene copolymer, styrene-ethylene-butylene copolymer, polyethylene terephthalate and polyamides. The polymeric waste materials may be comminuted to provide particles of polymeric waste prior to introduction into the reaction vessel. Alternatively, the plastic waste may be melted prior to introduction into the reaction vessel.

The shredded scrap automotive tires and the polymeric waste, whether particulate or molten, may be premixed to form a charge for the reaction vessel or they may be separately charged into the reaction vessel. In either case, the reaction vessel charge preferably has from about 25% to about 50% of scrap automotive tires and from about 50% to about 75% of plastic waste material.

After polymeric waste particles or melted polymeric waste are charged into the reaction vessel, the reaction vessel is closed, stirring is initiated and the reaction vessel is pressurized with a reaction gas selected from hydrogen and mixtures of hydrogen and hydrogen sulfide. The ratio of hydrogen sulfide to hydrogen for the reaction gas of the present invention is from 0:1 to about 1:1, based on pressure.

An oil soluble catalyst can also be added to polymeric waste in the reaction vessel. Suitable catalysts include molybdenum octoate, molybdenum acetyl acetonate, molybdenum hexacarbonyl and molybdenum napthanate. When used, the catalyst is preferably added at a level sufficient to provide from about 10 ppm to about 5,000 ppm of molybdenum.

For oxygenated polymers, it is preferred to use a catalyst and a hydrogen/hydrogen sulfide atmosphere.

A range of shredded automotive tire-plastic waste material feedstocks were tested utilizing a temperature of 385° C. The plastic scrap materials and scrap automotive tires were first converted to particles by use of suitable comminuting apparatus. The polymeric scrap particles and scrap automotive tires were introduced into a stirred autoclave, the autoclave was sealed and pressures were developed in the range of 1750/1800 psig. Table 1 summarizes the results of heating the various combinations of plastic scrap materials and synthetic rubber materials under hydrogen atmospheres in the stirred autoclave.

TABLE 1

| | | Liquification of Tire Tread-Scrap Plastics Mixtures | | | | | | | | |
|---|---|---|---|---|---|---|---|---|---|---|
| Run | Feed-Conditions | Gas | Oil Yield | Carbon black Yield | API Gravity | IBP-400° F. | 400° 650° F. | 650° 1000° F. | 1000° F. | End Point |
| A560-135 | 37.5% PS, 29.3% PP, 33.2% Vacuum Tubing. | $H_2S—H_2$ | 83.4% | 7.9%* | 35.3 | 55.4 | 25.9 | 18.7 | — | 868° F. |
| A560-137 | 34.5 PS, 30.4 PP, 35.0 PTT | $H_2S—H_2$ | 73.9 | 14.2 | 31.3 | 42.6 | 19.8 | 25.8 | 11.8 | — |
| A560-141 | 34.0 PS, 30.1 PP, 36.0 PTT | $H_2$ | 74.0 | 14.0 | 29.0 | 42.6 | 20.1 | 22.3 | 15.0 | — |
| A560-143 | 34.4 PS, 29.7 PP, 35.9 PTT | $H_2S—H_2$ | 76.1 | 14.0 | 30.3 | 51.0 | 23.1 | 25.8 | — | 942° F. |
| A560-145 | 34.1 PS, 31.7 PP, 34.1 PTT | $H_2$ | 75.2 | 14.6 | 30.8 | 56.2 | 20.9 | 19.9 | 3.0 | — |
| A598-5 | 65.0 PS, 35.0 TTT | $H_2S—H_2$ | 65.9 | 22.7 | 18.3 | 81.2 | 14.5 | 4.3 | — | 665° F. |
| A598-41 | 33.3 PS, 33.3 PP, 33.3 TTT | $H_2S—H_2$ | 61.1 | 18.5 | 30.3 | 31.2 | 21.5 | 31.6 | 15.7 | — |

* = Silica filler
PS = polystyrene, PP = polypropylene, PTT = passenger tire tread, TTT = truck tire tread In one run, not shown in Table 1, only tire scrap was charged to the reactor. The tire scrap remained solid and was not converted to an oil.

It is also within the scope of this invention to recycle any gas oils (b.p. 650°-1000° F.) and resids (b.p. >1000° F.) back into the reaction vessel and reprocess them with an additional charge of scrap automotive tires and polymeric waste to provide gasoline and diesel range hydrocarbon materials.

The present invention describes a simple process to convert scrap automotive tires and mixed waste scrap plastics to a synthetic crude oil which would be highly useful as a feedstock for a refinery. Only a small amount of coke is produced which can be reused as carbon black in the manufacture of tires. The coke could therefore be used as a fuel to supply process heat. The hydrocarbon products contain no oxygen, nitrogen or metals and would be suitable refinery feedstocks, when hydrogen alone is used. Sulfur is introduced when mixtures of hydrogen and hydrogen sulfide are used. Sulfur from the automotive tire scrap is also present in the feedstock. The presence of sulfur poses no problem to refiners and existing refinery equipment can be used to handle sulfur containing feedstocks. Diesel oil obtained from the process would be expected to have a high cetane number, particularly diesel oil produced from polyethylene. Such diesel oil would require hydrotreating for sulfur removal. Gas oils and residues contain sulfur and would be suitable cat cracker feedstocks after hydrotreating. The process of the present invention could readily use a mixed plastic separated by gravity segregation from municipal solid waste and any type of scrap automotive tire.

What is claimed is:

1. A method for converting waste tires to an oil feedstock comprising:

(a) providing a mixture of particulate automotive tires and polymeric waste, (b) charging said mixture into a reaction vessel, (c) contacting said mixture with a gas atmosphere selected from hydrogen and mixtures of hydrogen and hydrogen sulfide, and (d) heating said reaction mixture for a time sufficient to convert said mixture to liquid hydrocarbon materials having a boiling point below about 1000° F.

2. A method in accordance with claim 1 wherein said polymeric waste is fed to said reaction vessel in the form of particles.

3. A method in accordance with claim 1 wherein said polymeric waste is fed to said reaction vessel in the form of melted polymer.

4. A method in accordance with claim 1 wherein said polymeric waste is selected from the group consisting of polystyrene, polypropylene, medium density polyethylene, high density polyethylene, polyisoprene, styrene-butadiene copolymer, styrene-ethylene-butylene copolymer, polyethylene terephthalate and polyamides.

5. A method in accordance with claim 1 wherein said gas atmosphere is maintained at a pressure of from about 500 psig to about 5,000 psig during said contacting step.

6. A method in accordance with claim 1 wherein said gas atmosphere is maintained at a pressure of from about 750 psig to about 3,000 psig during said contacting step.

7. A method in accordance with claim 1 wherein said contacting is for a period of from about 15 minutes to about 8 hours.

8. A method in accordance with claim 1 wherein said contacting is for a period of from about 30 minutes to about 4 hours.

9. A method in accordance with claim 1 wherein a catalyst is present during said contacting step.

10. A method in accordance with claim 9 wherein said catalyst is selected from molybdenum octoate, molybdenum acetyl acetonate, molybdenum hexacarbonyl and molybdenum napthanate.

11. A method in accordance with claim 1 wherein said gas atmosphere has a hydrogen sulfide to hydrogen ratio of from 0:1 to about 1:1, based on pressure.

12. A method in accordance with claim 1 wherein high density polyethylene comprises less than about 25% of said polymeric waste charge.

13. A method in accordance with claim 1 wherein said contacting step takes place on a batch basis.

14. A method in accordance with claim 1 wherein said contacting step takes place on a continuous basis.

15. A method in accordance with claim 1 wherein said charge to said reaction vessel also comprises crude oil.

* * * * *